Marvin B. Glaser
Alan Schriesheim  Inventors

ALUMINUM HALIDE RECOVERY FROM HYDROCARBON REACTIONS

Marvin B. Glaser, Plainfield, and Alan Schriesheim, Fords, N.J., assignors to Esso Research and Engineering Company, a corporation of Delaware
Filed Dec. 31, 1958, Ser. No. 784,374
4 Claims. (Cl. 260—683.74)

The present invention concerns improvements in the catalytic treatment of hydrocarbons. More particularly the invention relates to improvements in the recovery and re-use of aluminum halides that have been employed as catalysts in relatively low temperature hydrocarbon conversion reactions.

In recent years there has been an increased demand for highly branched chain paraffin hydrocarbons, particularly those that boil in the motor fuel boiling range. This increased demand has been occasioned by a need for motor fuels of high octane number to satisfy the requirements of modern high compression internal combustion engines. One of the economically important ways of satisfying the demand for high octane rating fuels involves the isomerization of the light naphtha components of such fuels.

The isomerization of normal paraffin hydrocarbons of from 4 to 7 carbon atoms into the corresponding branched chain homologs is well known. For effecting the isomerization, it is customary to employ certain metal halides, particularly aluminum chloride or aluminum bromide, in conjunction with certain promoters, such as hydrogen chloride, hydrogen bromide or boron fluoride. Insofar as the isomerization of light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 50 to about 140° F.

Aluminum bromide is also known to be an active catalyst for the alkylation of isoparaffinic hydrocarbons with olefinic hydrocarbons to produce branched chain hydrocarbons that are useful motor fuel components. The same catalyst, with suitable promoters, can be employed to effect the liquid phase reaction of paraffin hydrocarbons of from 6 to 18 carbon atoms with isobutane or isopentane at temperatures of about 50° F. to about 140° F. to give products predominating in $C_5$ to $C_7$ branched chain hydrocarbons of high octane rating; in a process involving simultaneous cracking, isomerization and alkylation reactions.

One disadvantage in the use of aluminum bromide in reactions of the types outlined above is that it is appreciably soluble in the products, and may be present to the extent of 2 to 5 percent or more in the effluent from a commercial reactor. Because of this, a practical means must be available for recovering the aluminum bromide from the products so that it can be reused in those reactions. The recovery method employed must be one that will not cause degradation of the reaction products or of the catalyst.

Separation of aluminum bromide from hydrocarbon reaction products by simple distillation is a desirable method for catalyst recovery but such a process is complicated by undesirable cracking of the hydrocarbon product and by sludge formation, which occur when mixtures of aluminum bromide and hydrocarbons are heated at temperatures higher than about 140° F. Obviously any cracking which takes place is undesirable since it degrades products both with respect to octane number and volatility. Sludge formation is obviously undesirable since it consumes expensive catalyst.

It is thus one object of the present invention to provide a procedure for effectively recovering aluminum bromide from the products of hydrocarbon conversion reactions such as isomerization and alkylation so that the catalyst can be used again in such reactions and thus make the process economic.

In accordance with the present invention cracking of the products and sludge formation are prevented when separating aluminum bromide from hydrocarbon products by adding naphthenic hydrocarbons to the mixture in the distillation tower. The naphthenes that are added during distillation have boiling points above the range of the hydrocarbons in the aluminum-bromide hydrocarbon mixture that is distilled. The naphthenes and aluminum bromide that comprise the residue from that distillation step are sent to a second distillation tower wherein the naphthenes are separated from the aluminum bromide. The aluminum bromide is then recycled to the hydrocarbon reaction in which it is used as a catalyst, while the naphthenes recovered overhead from the second tower are recycled to the top of the first distillation tower.

It is preferred that the distillation be conducted during as short an interval as practicable, i.e. that flash distillation be used, with residence times of no more than 2 minutes and preferably of 10 seconds or less. Also, it is preferred that the flash temperature be slightly below, but within about 20 to 30° F., of the boiling point of the particular naphthene used.

The naphthenes employed are preferably those having tertiary carbon atoms, and, as stated above, they have boiling points above the boiling points of the hydrocarbons to be separated from the aluminum bromide. For a product containing $C_5$ to $C_7$ paraffins it is desirable to use a naphthene boiling between about 250° and 400° F. Since $AlBr_3$ boils above 500° F., the use of naphthenes boiling no higher than about 400° F. still permits easy separation of the naphthenes from the catalyst. Among the naphthenes that may be used are ethyl cyclohexane, dimethylcyclohexane, trimethylcyclohexane, decalin and polymethyl decalins. If the product contains no components higher than $C_6$ isoparaffins, lower boiling naphthenes such as methylcyclohexane or ethyl cyclopentane could be used. The amount of naphthenes added is preferably in the range of about 5 to 10 volume percent of the products being distilled, although from 3 to 20 volume percent is contemplated.

The features of this invention will be more fully understood when reference is made to the accompanying drawing.

Figure 1:
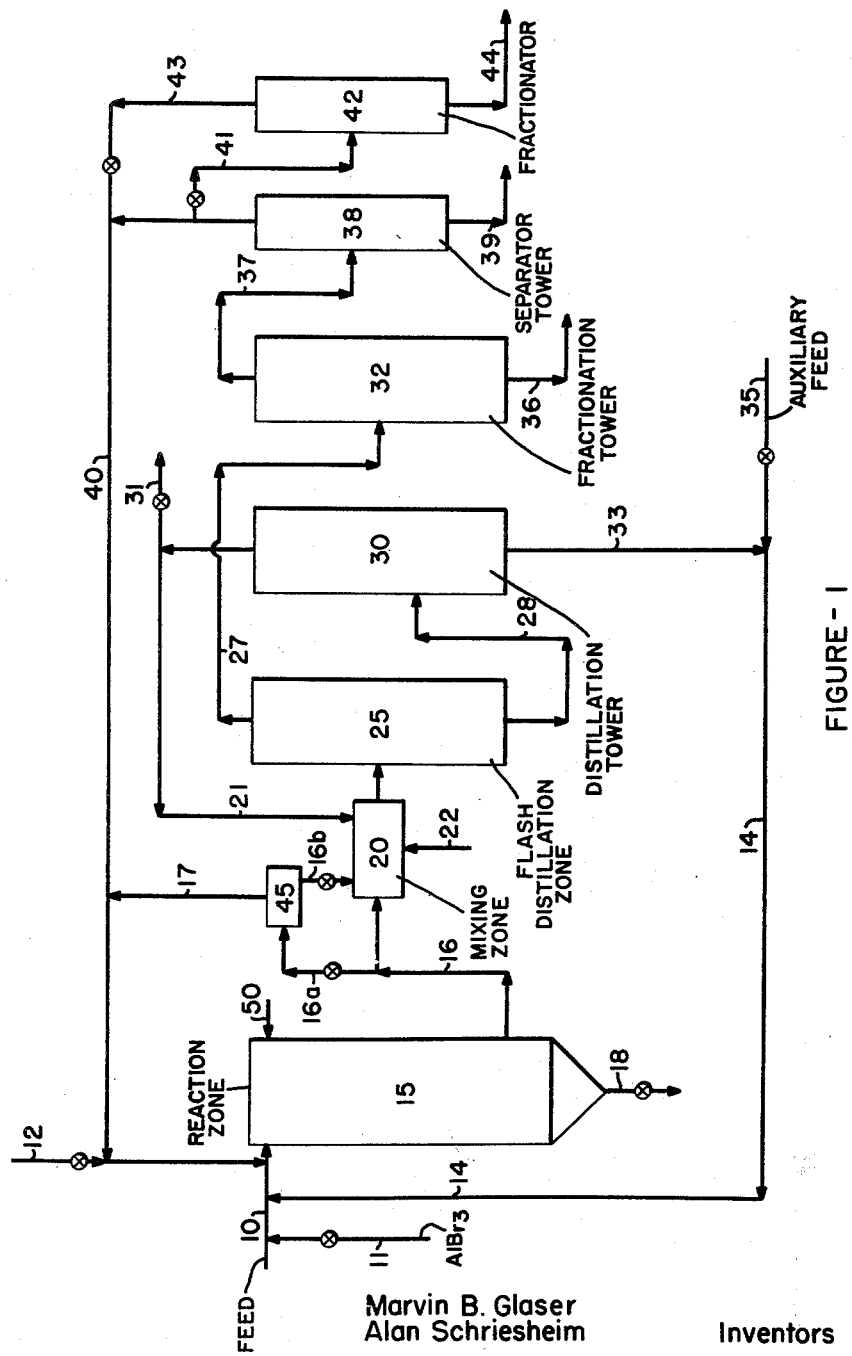
FIGURE 1 illustrates schematically a suitable arrangement of apparatus for conducting a process for isomerizing paraffin hydrocarbons.

Referring to FIGURE 1 of the drawing a feed comprising hydrocarbons to be isomerized, as for example a naphtha cut consisting principally of $C_5$ and $C_6$ paraffin hydrocarbons, is mixed in line 10 with a recycle stream comprising aluminum bromide from line 14. The resulting mixture is conducted into reaction zone 15. The concentration of aluminum bromide in the hydrocarbons entering reaction zone 15 is in the range of about 0.3 to 5% by weight, preferably 0.5 to 2% by weight. It is preferred for most efficient operation that the reaction zone contain a bed of a suitable support material, such as alumina, silica, bauxite or the like. A particularly effective support material is a partially dehydrated calcined bauxite known commercially as Porocel.

After equilibrium has been established, the support will be saturated with adsorbed aluminum bromide. In addition the hydrocarbons in contact with the support in the reaction zone 15 will contain 0.3 to 5 wt. percent, preferably 0.5 to 2 wt. percent, of dissolved aluminum bromide. The amount of halide on the support will vary with the type of support used. Porocel, for example, will adsorb about 50 weight percent of $AlBr_3$. Initially the aluminum bromide is introduced into the system through line 11, but after the process is underway the major portion of the aluminum bromide is introduced through recycle line 14 while only make-up aluminum bromide will enter through line 11. The amount of this make-up aluminum bromide will depend on the type of operation desired and may range, for example, from 0.1 to 5 percent by weight, based on fresh hydrocarbon feed. Excellent control of the amount of aluminum bromide added can be effected by passing a portion of the feed stream through a bed of aluminum bromide and diluting the saturated stream with the remainder of the feed stream.

If a hydrogen halide promoter is used, it is introduced with the feed in an amount sufficient to maintain a positive pressure of hydrogen halide of from 5 to 100 p.s.i.g. in the reaction zone. Initially, this promoter is introduced through line 12. After the process is underway, the major portion of the halide will be introduced through recycle line 40 while make-up promoter will enter through line 12.

It is desirable that the isomerization feed contain no more than a maximum of about 0.1% of aromatics. Benzene is present to the extent of 2 to 6 vol. percent in most naphthas but can be removed from the feed by solvent extraction, extractive distillation, hydrogenation or acid treating. Contacting the feed with an adsorbent, such as a molecular sieve zeolite of 13 A. pore size, for example, may also be used. Pretreatment of the feed to reduce the sulfur content to less than 0.001 wt. percent is also desirable.

The feed is conducted through the reaction zone at rates of the order of 0.1 to 2 v./v./hr. For isomerization, reaction temperatures of from about 50° to about 140° F., and pressures of from about atmospheric to about 200 p.s.i. are employed in reaction zone 15. Preferably, the reaction temperature is in the range of from about 60° to 80° F. for maximum production of highly branched isomers. Conditions in the reaction zone are preferably such that no sludge formation occurs. However, a relatively small amount of sludge may be formed in the reaction zone and this may be removed through valved line 18.

The reaction products together with dissolved aluminum bromide leave the reaction zone through line 16 and enter mixing zone 20, wherein they are mixed with a stream of recycled naphthene hydrocarbons from line 21 or with freshly added naphthene hydrocarbons from line 22. The mixture then is conducted via line 23 into flash distillation zone 25. Reaction products are carried overhead via line 27 to fractionation zone 32 while the bottoms product comprising naphthenes and aluminum bromide is removed through line 27 and conducted to distillation tower 30 wherein conditions are maintained to effect separation of at least a major portion of the naphthenes from the aluminum bromide. The naphthenes are removed overhead by means of line 21 and recycled to mixing zone 20. If there is a tendency for build-up of naphthenes a portion may be bled off through line 31. The bottoms from tower 30, which preferably comprise molten $AlBr_3$, are sent by means of lines 33 and 14 to reaction zone 15.

Alternatively, the recycle stream of $AlBr_3$ may be mixed with a portion of the feed introduced through line 35.

The overhead from flash distillation zone 25 is conducted through line 27 to fractionation tower 32 wherein conditions are maintained to effect separation between the desired product and any lighter materials. For example, tower 32 may be used as a debutanizer tower, sending $C_4$ and lower hydrocarbons overhead through line 37, while $C_5$ hydrocarbons and higher leave through line 36. Hydrogen halides, when used as promoters, may be separated from the overhead of tower 32 in tower 38, the separated gases being recycled to the reaction zone through line 40, while the hydrocarbons from which the gases are separated leave through line 39.

If tower 32 has been used as a debutanizer and it is desired to recover $C_4$ hydrocarbons separately for recycle to the reaction zone, or for other uses, tower 38 may be employed as a depropanizer, in which case the $C_4$ hydrocarbons would be collected in line 39 while the overhead would pass via line 41 into another fractionator 42 to effect separation between the hydrogen halide gases and $C_3$ and lighter hydrocarbons. The hydrogen halides would then be conducted to recycle line 40 through line 43.

An alternative method of recovering hydrogen halides is to send the reactor products via line 16a to a low temperature flash zone 45 where the hydrogen halides are separated from the product and conducted via line 17 to recycle line 40 while the flashed product is carried through line 16b to mixing zone 20.

Although the process has been described with respect to its application to the isomerization of paraffin hydrocarbons the procedure is also applicable to aluminum bromide recovery in what has been termed a paraffin alkylation reaction, as for example in the reaction of isobutane with normal heptane under conditions favoring simultaneous cracking, isomerization and alkylation reactions wherein a net consumption of isobutane occurs and the products of the reaction predominate in isomers of $C_5$ and $C_6$ paraffin hydrocarbons along with some $C_7$ paraffin hydrocarbons. Conditions are somewhat more severe than for isomerization but not severe enough to cause undesired cracking. One way to increase severity is to employ lower feed rates. A high proportion of isobutane to normal heptane, e.g. 3 to 1 volume ratio, is employed in order to effect the desired alkylation reactions and to prevent catalyst sludging.

To conduct a paraffin alkylation reaction with the system shown in the drawing, feed line 10 is employed for the isobutane feed, feed line 11 for isobutane containing dissolved aluminum bromide make-up, and feed line 50 for the higher isoparaffin such as n-heptane. Separation of hydrogen halide promoter and recovery of dissolved aluminum bromide from the product are effected in the same manner as previously described.

In paraffin alkylation reactions it is important, for minimum catalyst consumption, to employ $AlBr_3$ of very high purity (99% or higher) rather than technical grades of about 96% purity. Catalyst consumption may be reduced as much as 60 to 80 percent with the pure material as compared with the technical grade material.

As a specific example of a paraffin alkylation reaction, a mixture of 160 cc. of isobutane, 38 cc. of normal heptane and 2 cc. of methyl cyclohexane contacted with 24 grams of $AlBr_3$, 47 grams of Porocel and 17 grams of hydrogen bromide for 3 hours at 72° F. gave a product in which the $C_5+$ fraction consisted of 33.5% isopentane, 6% normal pentane, 23.5% isohexanes, 1% normal hexane, 32.5% isoheptanes and 3.5% normal heptane.

The benefits to be derived from this invention are illustrated by the following examples.

EXAMPLE 1

A mixture of hydrocarbons, principally $C_5$ and $C_6$ hydrocarbons, representative of a typical alkylate that would be obtained in a paraffin alkylation reaction, was prepared. Approximately 10 weight percent of aluminum bromide was added to this mixture. Additionally to one portion of the mixture 6 wt. percent of methylcyclohexane was added. Each of the samples was then distilled over a temperature range of 75 to 500° F. in a period of 2 hours and the extent of cracking that resulted was measured. The composition of the charge to the still and the composition of the distillate obtained in each instance are shown in Table I. It will be seen that the addition of the naphthene reduced cracking of the product by about 80%.

*Table I*

| Run No. | 1 | 2 |
|---|---|---|
| Wt. Percent Methylcyclohexane in Charge | 0 | 6.0 |
| Wt. Percent AlBr$_3$ in C$_5$/C$_8$ Still Charge | 10 | 10.3 |
| Distillation Temp. Range, ° F | 75–500 | 80–500 |
| Distillation Time, Hrs | 2 | 2 |
| Still Charge, Wt. Percent: | | |
| C$_4$− | 0.2 | 0.2 |
| C$_5$ | 52.5 | 49.2 |
| C$_6$ | 36.7 | 34.6 |
| C$_7$ | 2.7 | 8.6 |
| C$_8$+ | 7.9 | 7.4 |
| Overhead Distillate, Wt. Percent: | | |
| C$_4$− | 18.6 | 4.0 |
| C$_5$ | 38.6 | 48.9 |
| C$_6$ | 33.1 | 35.4 |
| C$_7$ | 3.6 | 7.5 |
| C$_8$+ | 6.1 | 4.2 |

EXAMPLE 2

A mixture of paraffin hydrocarbons representative of an alkylate was prepared, and in it was dissolved about 10 percent of purified AlBr$_3$ (purity 99+%). Decalin was added to one portion of the mixture while another portion contained no added naphthenes. Both portions were distilled at atmospheric pressure in a batch operation over a two hour period at temperatures of 80 to 400° F. The amount of C$_4$ and lower hydrocarbons formed was noted as a measure of the extent of cracking. As shown in Table II the decalin reduced cracking from 4.4 percent to 1.5 percent.

*Table II*

|  | No Naphthenes | Naphthenes Added |
|---|---|---|
| Distillation: | | |
| Time, min | 126 | 120 |
| Stillpot Temp., ° F., Initial/Final | 80/350 | 81/400 |
| Reflux Ratio | 2:1 | 2:1 |
| Total Recovery | 98.5 | 97.6 |
| Feed: | | |
| AlBr$_3$ Conc. Wt. Percent | 9.8 | 9.5 |
| Hydroc. Anal., Wt. Percent— | | |
| i+nC$_4$− | 0.3 | 0.1 |
| i+nC$_5$ | 38.3 | 20.8 |
| i+nC$_6$ | 36.6 | 24.6 |
| i+nC$_7$ | 3.8 | 33.1 |
| i+nC$_8$+ | 20.9 | 21.4 |
| Wt. Percent Decalin | 0 | 8.5 |
| Overhead Distillate: | | |
| Hydroc. Anal., Wt. Percent— | | |
| i+nC$_4$− | 4.7 | 1.6 |
| i+nC$_5$ | 38.4 | 18.5 |
| i+nC$_6$ | 34.0 | 24.8 |
| i+nC$_7$ | 4.7 | 40.3 |
| i+nC$_8$+ | 18.2 | 14.8 |
| Total Cracking, Wt. Percent— | | |
| C$_4$− | 4.4 | 1.5 |

EXAMPLE 3

Figure 2:
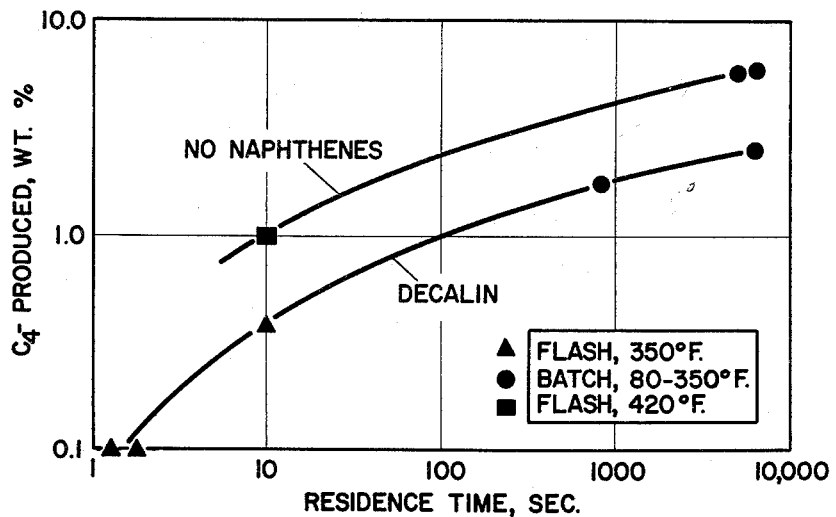
FIGURES 2 and 3 are graphs showing, respectively, the effect of residence time and of flash temperature on the extent of cracking produced when distilling hydrocarbon solutions of aluminum bromide.

A mixture of paraffin hydrocarbons representative of an alkylate was prepared containing 25 volume percent of C$_5$ isomers, 25 volume percent of C$_6$ isomers, 30 volume percent of C$_7$ isomers and 20 volume percent of C$_8$ isomers. About 4 weight percent of AlBr$_3$ (99+% purity) was dissolved in the mixture. Flash distillation studies were made with portions of the mixture to which about 5 volume percent of decalin had been added and with other portions containing no added naphthenes. Residence times were varied and flash temperatures of from 270° to 420° F. were used. The results obtained established that cracking, as measured by the amount of C$_4$ hydrocarbons and lower produced, was markedly reduced when decalin was present and when contact times of 10 seconds or less were used. The results are graphically compared in FIGURE 2. The data are compared with batch distillation tests also, in the figure. The minimum distillation time attainable in batch tests was 11 minutes. Cutting residence time from 11 minutes to 2 seconds reduced cracking by 90%.

Figure 3:
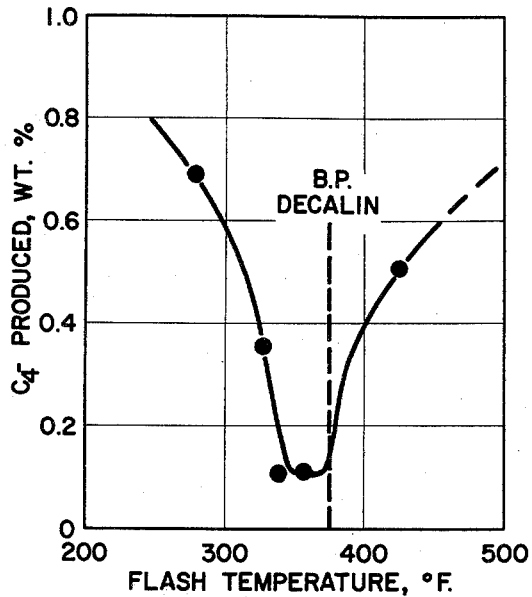

Comparing flash temperatures in flash tests of 1 to 2.2 seconds residence time with the 5 volume percent of decalin established that minimum cracking occurred slightly below the boiling point of decalin. This is shown in FIGURE 3. Although the invention is not to be limited by any theory regarding this, it is possible that cracking was minimized at the 330–360° F. point because of increased decalin content in the bottoms at this temperature. Sludge formation in the bottoms and degradation of the aluminum bromide were also minimized at this temperature as shown in Table III.

*Table III*

| Flash Temperature, ° F. | Residence Time, Seconds | Sludge Make | C$_4$N Make, Wt. Percent |
|---|---|---|---|
| 270 | 2.2 | Appreciable | 0.7 |
| 320 | 1.0 | AlBr$_3$ Discolored | 0.3 |
| 330 | 2.0 | None | 0.1 |
| 350 | 1.5 | None | 0.1 |
| 420 | 1.5 | AlBr$_3$ Discolored | 0.5 |

This invention is not to be limited by any theory regarding its operation; nor is it to be limited by the specific examples herein presented or the specific embodiments herein described. The scope of the invention is to be determined by the appended claims.

What is claimed is:

1. In the recovery of reaction products of the catalytic treatment of paraffinic hydrocarbons in the presence of aluminum bromide catalyst, in a reaction zone, wherein the products of the reaction comprise principally branched chain paraffin hydrocarbons of from about 4 to 7 carbon atoms, and including the step of removing from the reaction zone hydrocarbon products containing dissolved aluminum bromide, the improvement which comprises adding to said hydrocarbon products withdrawn from said reaction zone from 3 to 20 volume percent of a naphthenic hydrocarbon having a boiling point above the boiling range of said hydrocarbon products, flash distilling said hydrocarbon products overhead from said aluminum bromide in the presence of said added naphthenic hydrocarbon and at temperature above 140° F., separating said naphthenic hydrocarbon from aluminum bromide for further addition of said naphthenic hydrocarbon to hydrocarbon products withdrawn from said reaction zone, and recyling recovered aluminum bromide to said reaction zone.

2. Process as defined by claim 1 including the steps of separating said hydrocarbon products from naphthenic hydrocarbon and aluminum bromide in a first distillation zone and separating naphthenic hydrocarbon from aluminum bromide in a second distillation zone.

3. In the recovery of the reaction products of the catalytic treatment of paraffinic hydrocarbons in the presence of aluminum bromide catalyst and a promoter in a reaction zone, wherein the products of the reaction comprise principally branched chain paraffinic hydrocarbons of from about 4 to 7 carbon atoms, and including the step of removing from the reaction zone hydrocarbon products containing dissolved aluminum bromide, the improvement which comprises the steps of separating the products withdrawn from the reaction zone from at least the major portion of the promoter, thereafter adding to said hydrocarbon products from 3 to 20 volume percent of a naphthenic hydrocarbon boiling above said reaction products, flash distilling at temperatures above 140° F. hydrocarbon products from said aluminum bromide in the presence of said added naphthenic hydrocarbon, distilling said added naphthenes from said aluminum bromide, recycling aluminum bromide to the reaction zone and recycling at least a portion of the naphthenes to the flash distillation zone.

4. The process of claim 3 wherein said flash distillation residence time is no more than two minutes.

References Cited in the file of this patent

UNITED STATES PATENTS

| | | |
|---|---|---|
| 2,395,022 | Sutton et al. | Feb. 19, 1946 |
| 2,412,143 | Gorin et al. | Dec. 3, 1946 |
| 2,421,524 | Ross et al. | June 3, 1947 |
| 2,462,384 | Gorin et al. | Feb. 22, 1949 |
| 2,905,598 | Zinke-Allmang et al. | Sept. 22, 1959 |
| 2,946,833 | Kimberlin et al. | July 26, 1960 |

FOREIGN PATENTS

| | | |
|---|---|---|
| 559,426 | Great Britain | Feb. 18, 1944 |